Patented July 26, 1932

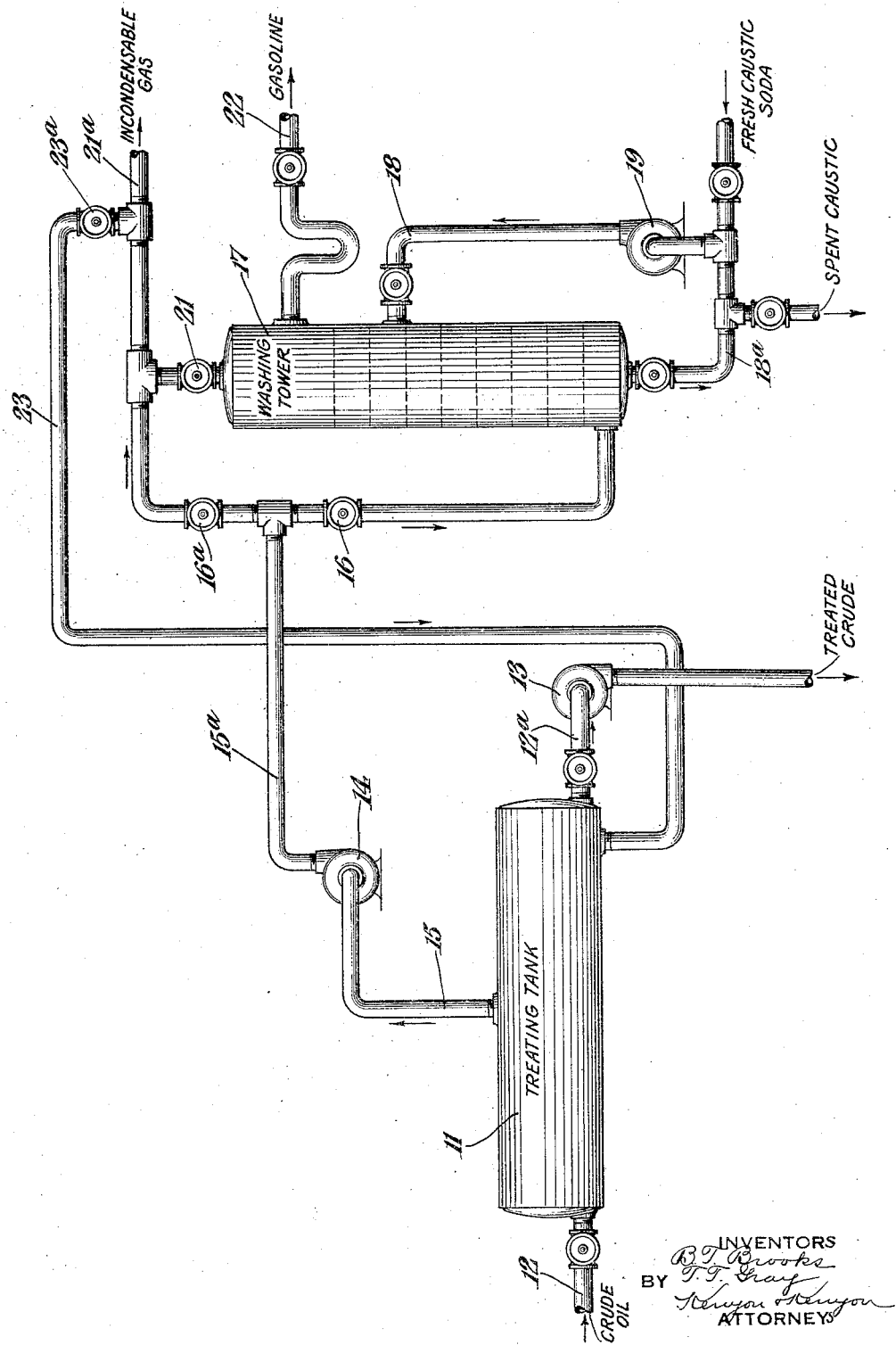

1,868,966

UNITED STATES PATENT OFFICE

BENJAMIN T. BROOKS, OF SOUND BEACH, CONNECTICUT, AND THOMAS T. GRAY, OF ELIZABETH, NEW JERSEY, ASSIGNORS TO GRAY PROCESSES CORPORATION, OF NEWARK, NEW JERSEY, A CORPORATION OF DELAWARE

TREATMENT OF CRUDE PETROLEUM

Application filed April 18, 1928. Serial No. 271,090.

This invention relates to improvements in the treatment of crude petroleums, and has for an object to remove hydrogen sulfide from crude petroleum expeditiously and inexpensively.

Many crude petroleums as they issue from the wells contain dissolved hydrogen sulfide, which is slowly liberated from the oil obtained from such petroleums when kept in storage tanks and other containers, and in many fields the crude oils contain so much of this gas as to constitute a source of danger to life. It is also the chief cause of the corrosion of much iron and steel equipment, since in the presence of hydrogen sulfide and moisture or salt water, the corrosion of pipe lines, storage tanks and other containers is unusually rapid.

The treatment of crude petroleum for the removal of hydrogen sulfide at a reasonably low cost has heretofore been a very troublesome problem. Crude petroleums containing hydrogen sulfide also contain asphaltic matter and emulsified salt water, with the result that, when it is attempted to remove the dissolved hydrogen sulfide with lime, caustic soda, sodium carbonate or other alkalies, the lime and magnesia salts present in the salt water are precipitated and a very troublesome emulsion results. Moreover, when it is attempted to wash out the hydrogen sulfide with water, large volumes of water are required, and probably due to the asphaltic matter in the oil and the nature of the emulsified salt water contained in the oil, voluminous and troublesome emulsions are formed.

The present invention circumvents these difficulties and at the same time permits the removal of hydrogen sulfide to be carried out in relatively simple and inexpensive apparatus, so that the crude oil may be treated in the fields where it is produced and before it is placed in storage tanks or pumped through the costly trunk pipe lines. The particular utility of the invention is in making safe the areas about storage tanks containing crude oil and in preventing or reducing the corrosion of iron or steel equipment.

The invention consists essentially in subjecting the oil to sub-atmospheric pressures under such conditions that the hydrogen sulfide therein is substantially removed. This is accomplished by subjecting a body of oil, preferably while agitated or in a flowing stream to the influence of diminished pressure in a suitable vessel. Any conditions of flow may be used; turbulence may be induced or the oil may be caused to flow over baffles or may be disposed in a thin stream, the preferable method being to present during the course of operation as large a total surface of oil as possible to the free space maintained under sub-atmospheric pressure. Under these conditions, the hydrogen sulfide, with which many crude oils have been charged under the relatively large gas pressures prevailing in oil-bearing strata, is effectually removed. Ordinarily, it will be accompanied by fixed or non-condensible gases in amounts depending upon their proportions in the crude oil, and also by some part of the lighter condensible or gasoline fractions of the oil being treated. These materials may readily be recovered from the exhaust side of the pump (or other device used to maintain the suction) by methods known in the art.

In many cases, it will be desirable to remove the hydrogen sulfide from these gaseous and liquid products before using them, although this step may be dispensed with and the hydrogen sulfide left mixed with the lighter products. If it is desired to minimize the decrease in Baumé gravity of the oil being treated, this may be done by returning the wet gases to the treated crude oil. In this event, the hydrogen sulfide must, of course, first be removed from the gases, which may then be passed countercurrent to or otherwise absorbed in the treated crude oil. Where desired, all or portions of the hydrogen sulfide-free gases may be returned to the oil undergoing treatment, thereby aiding in the agitation of the oil. Highly corrosive crudes can be freed from their hydrogen sulfide by the treatment above outlined and thus rendered in such condition as to eliminate great items of expense and waste in their storage and transportation.

Other objects, novel features and advantages will be apparent from the following specification and accompanying drawing wherein the single figure discloses diagrammatically one form of apparatus suitable for treating crude petroleum in accordance with this invention, and it is apparent that other forms of apparatus will readily suggest themselves to those skilled in the art.

In the drawing, 11 represents a treating tank or vessel constructed in such a way as to render it capable of withstanding external pressures of the order of the difference between atmospheric pressure and the sub-atmospheric pressure it is desired to maintain therein. It is provided near the bottom with oil inlet pipe 12 and oil outlet pipe 12a, to the latter of which is connected the discharge pump 13.

A suction device 14 is connected to the tank by means of a pipe 15 entering it near its top. The exhaust side of the suction device is connected through pipe 15a and valve 16 with the lower part of scrubbing chamber 17, at the upper part of which is valve 21 and line 21a for effluent gases. A valve 16a is provided in a by-pass enabling the exhaust gases from pump 14 to be delivered directly into line 21a, by-passing the tank 17 if desired. The scrubbing tank is also provided with circulating lines 18 and pump 19 and the requisite valves for circulating scrubbing liquids countercurrent to the gas stream. At a level between the gas outlet and the upper connection of the circulating lines is an outlet 22 provided with suitable valves and traps for removing condensed gasoline from the scrubbing tank. A pipe 23 controlled by a valve 23a leads from the line 21a to the bottom of the treating tank 11. Crude oil containing hydrogen sulfide is supplied from a source not shown through pipe 12 and caused to flow into and through vessel 11 in such a way as to present a thin stream; or, if desired, tank 11 may be supplied with baffles (not shown) to cause a turbulent flow or other means for agitation well known in the art may be employed. For example, the scrubbed gases from 21a may be led back through pipe 23 to the bottom of tank 11 to aid in the agitation. The treating tank 11 is maintained at a sub-atmospheric pressure by the vacuum pump or other suction device 14. Due to the agitation and suction, the oil gives up its hydrogen sulfide together with other of its volatile constituents, and these are removed in vapor form through pipe 15. The purified oil is removed through pipe 12a by means of the pump 13 and thereafter disposed of in any way that may be desired.

The process may be carried on in the batch or continuous manner. If it is purposed to use the vapors discharged by pump 14 in any manner which would require that they be free of hydrogen sulfide, valve 16a is closed and valves 16 and 21 opened so that exhausted vapors pass upwards through the scrubbing tank 17. Coincidentally, by means of lines 18 and pump 19, a stream of solution capable of absorbing hydrogen sulfide is contacted with the gas stream. This solution may be milk of lime or caustic soda or any other known in the art. The treated vapors pass out through line 21a and may then be disposed of in manners well known in the art. For example, they may be immediately passed to storage or burners. They may also entirely or in part be passed through an absorber or other device for recovering gasoline therefrom. If an oil absorber is used, the absorption oil may very well be the oil leaving the treating tank 11, or any other oil may be used. Part or all of the gas, either before or after absorption of its gasoline constituents, may be transferred to tank 11 to assist in agitating the oil.

If, as is shown, the tank 17 is maintained at a higher pressure than tank 11, part of the gasoline which is volatilized by the action of the vacuum pump 14 will condense in 17. This liquid may be removed either continuously or intermittently, depending on the amount in which it is present, by means of pipe 22. If it is not desired to remove hydrogen sulfide from the vapors discharged from the pump 14, valves 16 and 21 may be closed and valve 16a opened so that the vapors will by-pass the scrubbing chamber 17 and flow directly into line 21a By proceeding in this manner, crude oils which are otherwise highly corrosive can be freed from their hydrogen sulfide without giving rise to troublesome emulsions. The resulting product may be stored or transported without corrosion of expensive tanks and pipe lines.

From the above description, it will be understood that the process disclosed can be operated in other apparatus than the one described, which is merely one way of practising it and is limited only by the scope of the claims.

We claim:

1. The process of purifying crude oil which comprises removing incondensible gases and hydrogen sulfide by subjecting a body of crude oil to sub-atmospheric pressure, separating hydrogen sulfide from the incondensible gases by washing, and returning washed incondensible gases into said body of oil to effect agitation thereof.

2. The process of purifying crude oil which comprises removing incondensible gases and hydrogen sulphide by subjecting a body of crude oil to sub-atmospheric pressure, separating hydrogen sulphide from incondensible gases and returning such incondensible gases into said body of oil to effect agitation thereof.

In testimony whereof, we have signed our names to this specification.

BENJAMIN T. BROOKS.
THOMAS T. GRAY.